Figure 1:
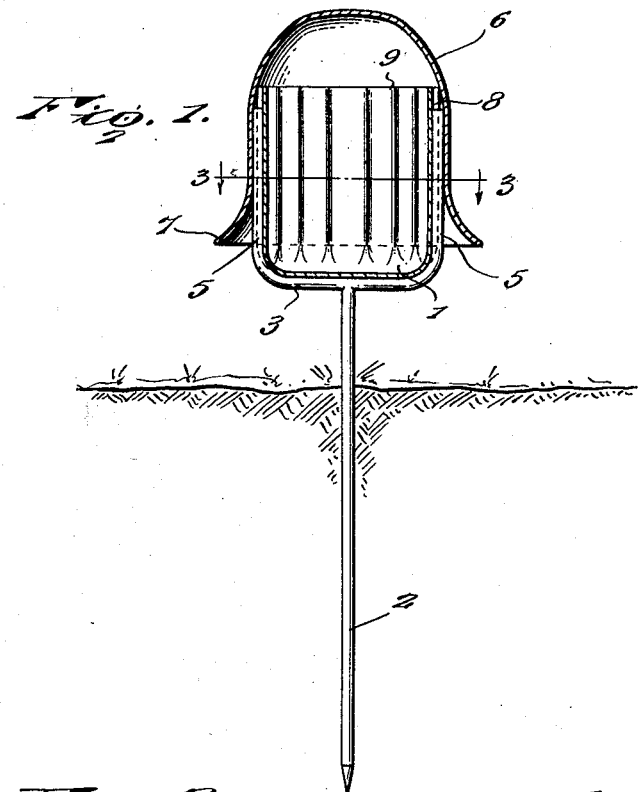

Feb. 25, 1930.  C. W. HUGHETT  1,748,449
POISON CONTAINER
Filed Feb. 5, 1929

Inventor
C. W. Hughett.
By
Lacey & Lacey, Attorneys

Patented Feb. 25, 1930

1,748,449

UNITED STATES PATENT OFFICE

CLARENCE W. HUGHETT, OF FRESNO, CALIFORNIA

POISON CONTAINER

Application filed February 5, 1929. Serial No. 337,650.

The object of this invention is to provide a very simple and inexpensive device by which poison may be made accessible to insects, more particularly ants, and which device may be used within a building or on a lawn or other infested place. The invention is illustrated in the accompanying drawing and will be hereinafter fully set forth and particularly defined.

Figure 2:
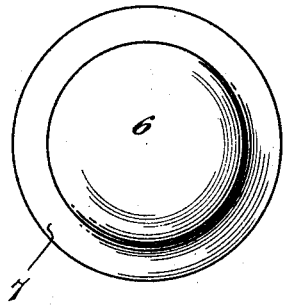
Figure 3:
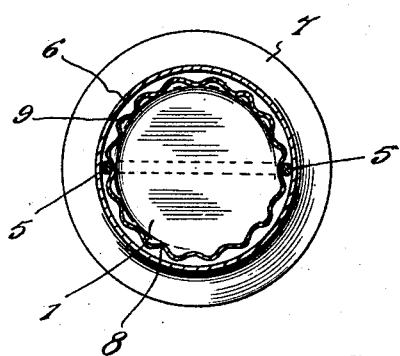

In the drawings:

Figure 1 is a vertical diametrical section of the device as it appears set in the ground, Fig. 2 is a top plan view, and Fig. 3 is a horizontal section on the line 3—3 of Fig. 1.

The container embodying my invention comprises a cup 1 which is open at its upper end and has a flat bottom, as clearly shown in Fig. 1, whereby it may rest upon a table, shelf or other infested place. The cup is, however, generally supported by a spike 2 which is adapted to be driven in the ground to anchor the cup at any desired point or to pierce the limb of a tree which may be infested so as to secure the cup in an upright position on the limb. This anchoring spike may be of any length most suitable for the particular use to which the device is to be put, it being obvious that a short spike will suffice where the device is to be applied to a tree limb and a longer spike is desirable when the device is placed in a lawn. The spike has its upper end integral with a cross bar 3 which is adapted to extend across the bottom of the cup and has its ends 5 upturned to form a U-shaped head which will embrace the cup. Fitting over the cup is a hood or cap 6 which has an internal diameter substantially equal to the external diameter of the cup so that the cover or hood will be firmly held frictionally against displacement. The top of the cover is imperforate and is preferably hemispherical so that it will effectually shed water in an obvious manner. The lower edge or rim of the hood is flared, as shown at 7, in order that it may deflect from the cup any water which may tend to fall upon the device and also provide an ample passage or opening through which the ants may pass to the interior of the device and fumes from the poison may escape to meet the ants seeking entrance. Passages 8 are provided between the walls of the cup and the hood, and in the drawing these passages are provided by forming corrugations 9 in the wall of the cup.

The device is intended to be applied to the limb of a tree in the path of the ants which infest the tree or to be set in a lawn adjacent the ant holes. Any insecticide which has been found to be efficient in destroying ants may be employed and the insecticide is placed in the cup, after which the hood or cover is fitted down over the cup, as shown, so that the sun or the rain will be prevented from having access to the cup. It has been found that the ants are attracted by the odor of the insecticide and endeavor to reach the same so that they will travel under the hood and up through the passages provided by the corrugations. It has also been found that the heat of the sun playing upon the hood will vaporize the insecticide and the fumes thus created will pass out through the corrugations and spread over the surface of the ground or the limb of the tree so that they will reach the ants at points somewhat remote from the device. The frictional engagement between the hood and the cup effectually retains the hood in place while it may be easily withdrawn with a slight force when the supply of poison is to be replenished. It will be noted that, as shown in Figs. 1 and 3, the upturned ends 5 are inserted in diametrically opposite corrugations 9 to closely embrace and support the device, and the corrugations merge into the bottom of the cup to facilitate the placement or withdrawal of the spike. When in place, the ends 5 bind between the cup and the hood and thereby aid in retaining the hood on the cup. When the device is to be used on a table, shelf, or other indoor place, the spike is withdrawn and the device rested on the flat bottom of the cup. The flared lower end of the hood will then check and resist any tendency of the cup to upset. The device may be very cheaply produced and may be made in various sizes as preferred while its form is such that it may be used in large numbers without detracting perceptibly from the neat appearance of any lawn.

Having thus described the invention, I claim:

1. A device for the purpose stated comprising a cup, a hood enclosing the cup, and an anchor having upstanding end members engaging between the hood and the cup at diametrically opposite points thereof, vertically extending passages being provided at the side of the cup to afford ingress thereto and receive the end members of the anchor.

2. A device for the purpose set forth comprising a cup having a flat bottom and having vertical corrugations in its sides merging into the flat bottom, a hood fitting over and around the cup, and an anchor having a U-shaped head extending across the bottom of the cup and engaging in diametrically opposite corrugations in the sides of the cup.

In testimony whereof I affix my signature.

CLARENCE W. HUGHETT. [L. S.]